(12) United States Patent
Umamaheswaran et al.

(10) Patent No.: US 8,566,133 B2
(45) Date of Patent: Oct. 22, 2013

(54) DETERMINING ACTIVITY OUTLIERS FROM AMONGST A PEER GROUPING OF EMPLOYEES

(75) Inventors: Rangarajan Umamaheswaran, Charlotte, CA (US); Brett A. Nielson, Spangle, WA (US)

(73) Assignee: Bank of America Corporation, Charlotte, NC (US)

( * ) Notice: Subject to any disclaimer, the term of this patent is extended or adjusted under 35 U.S.C. 154(b) by 102 days.

(21) Appl. No.: 13/192,225

(22) Filed: Jul. 27, 2011

(65) Prior Publication Data

US 2013/0030861 A1 Jan. 31, 2013

(51) Int. Cl.
*G06Q 40/00* (2012.01)
(52) U.S. Cl.
USPC .......................... 705/7.11; 705/7.42
(58) Field of Classification Search
USPC ............................ 705/7, 7.11, 7.42
See application file for complete search history.

(56) References Cited

U.S. PATENT DOCUMENTS

| | | | |
|---|---|---|---|
| 6,424,929 B1 * | 7/2002 | Dawes | 702/179 |
| 8,082,172 B2 * | 12/2011 | Chao et al. | 705/7.39 |
| 8,285,585 B2 * | 10/2012 | Chao et al. | 705/7.39 |
| 8,311,772 B2 * | 11/2012 | Hoffman | 702/179 |
| 2006/0265230 A1 * | 11/2006 | Shiga | 705/1 |
| 2012/0046989 A1 * | 2/2012 | Baikalov et al. | 705/7.28 |

\* cited by examiner

*Primary Examiner* — Thomas Dixon
*Assistant Examiner* — Benjamin S Fields
(74) *Attorney, Agent, or Firm* — Michael A. Springs; Moore & Van Allen PLLC; James C. Edwards

(57) ABSTRACT

Systems, methods, and computer program products are provided for identifying activity outliers from amongst employees/associates within a predetermined peer group of employees. The inventive concepts herein disclosed require establishing consistent peer groupings of employees/associates. In specific embodiments, the peer groupings may be defined by combining one or more and, typically two, line of business hierarchies and job title. Once the peer grouping is established, monitoring of pre-determined activities within designated applications is performed to determine the number of occurrence of the predetermined activities over a designated period of time. Activity outliers are subsequently determined based on the number of occurrence of the predetermined activities over the designated period of time. In specific embodiments, such determination of activity outliers includes determining peer group averages, an employee/associate's variance from the average, the employee/associate's standard deviation and the employee/associate's z-score.

16 Claims, 5 Drawing Sheets

DETERMINING ACTIVITY OUTLIERS FROM AMONGST A PEER GROUPING OF EMPLOYEES

FIELD

In general, embodiments herein disclosed relate to monitoring internal computing activities and, more specifically determining activity outliers from amongst peer groupings of employees/associates.

BACKGROUND

Many business entities, such as financial institutions and the like provide their employees/associates access to conduct a wide range of activities. For example, financial institution associates may be entitled to transfer funds amongst accounts, raise or lower interest rates for a customer's loan accounts, open and close customer accounts, change a customer's personal data and the like. Such activities when conducted within the scope of the job are not necessarily a cause for concern. However, since many of these activities may be prone to being conducted, either intentionally or intentionally, outside the scope of the job (i.e., unauthorized or illegally) it is imperative that the business entity attempt to determine, at the onset of the activity, that such unapproved and/or illegal activity is occurring. In many instances, single activities/events that rise to a level of concern, such as a large dollar amount transactions or the like, may have the necessary preventive measures, such as additional approval requirements, in place to insure that the activity is being properly conducted. However, many other unauthorized or illegal activities/events that would otherwise not be considered significant enough to warrant heightened scrutiny may occur without being detected by the business entity. These smaller or less noticeable activities events may be part of a larger scheme of illegal activity. In this regard, the business entity may benefit from determining which employees/associates are conducting certain activities at a higher rate than their peers.

Therefore, a need exists to identify activity outliers within a business entity. Specifically, a need exists to determine which employees/associates within a business entity conduct specific activities at a higher than normal rate occurrence as compared to their respective peers.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for identifying activity outliers from amongst employees/associates within a predetermined peer group of employees. The inventive concepts herein disclosed require establishing consistent peer groupings of employees/associates. In specific embodiments, the peer groupings may be defined by combining one or more and, typically two, line of business hierarchies and job title. Once the peer grouping is established, monitoring of predetermined activities within designated applications is performed to determine the number of occurrence of the predetermined activities over a designated period of time. Activity outliers are subsequently determined based on the number of occurrence of the predetermined activities over the designated period of time. In specific embodiments, such determination of activity outliers includes determining the peer group average, determining an employee/associate's variance from the average, determining the employee/associate's standard deviation and determining the employee/associate's z-score. The z-scores are then ranked in descending order to identify the activity outliers. In specific embodiments, a positive z score indicates an activity outlier and further investigation is conducted on the activity outlier to determine if the activities conducted by the employee/associate are adverse to the best interests of the business entity.

A method for identifying activity outliers from amongst a peer group within an entity defines first embodiments of the invention. The method includes identifying, based on one or more peer characteristics, a peer group that includes a plurality of employees associated with an entity. The method further includes monitoring, via a computing device processor, for each of the plurality of employees, a number of occurrences of performing an application-related activity over a designated time period. In addition, the method includes determining, via a computing device processor, one or more activity outliers from the plurality of employees based at least in part on the monitoring of the number of occurrences of performing the application-related activity over the designated time period.

In specific embodiments of the method, identifying the peer group further includes identifying, based on a job title, a job title and a hierarchy within the entity or a job title and two or more hierarchies within the entity, the peer group plurality of employees associated with the entity.

In further specific embodiments of the method, monitoring further includes monitoring, via the computing device processor, for each of the plurality of employees, the number of occurrences of accessing non-public information over the designated time period. In other specific embodiments of the method, monitoring further includes monitoring, via a computing device processor, for each of the plurality of employees, the number of occurrences of performing a high risk application-related activity, such as a high-risk application-related activity is related to customer accounts/transactions or the like.

In additional specific embodiments of the method, determining further includes determining, via a computing device, a z-score for each of the plurality of employees based on the number of occurrences of performing the application-related activity over the designated time period. In such embodiments of the method, determining may further include determining, via the computing device processor, the activity outlier based on the z-score meeting or exceeding a predetermined z-score threshold. In further such embodiments of the method determining the z-score may further include determining, via a computing device processor, for each of the plurality of employees, a variance from a peer grouping average number of occurrences of performing the application-related activity over the designated time period, and determining, via a computing device processor, a standard deviation, for the plurality of employees, based on a cumulative total number of occurrences of performing the application-related activity over the designated time period.

Moreover, in further specific embodiment the method includes investigating the one or more activity outliers from the plurality employees to determine whether actions of one or more activity outliers are adverse to best interests of the entity.

An apparatus for identifying activity outliers from amongst a peer group within an entity defines second embodiments of the invention. The apparatus includes a computing platform including a processor and a memory in communication with the processor. The apparatus further includes an activity monitoring module stored in the memory, executable by the processor and configured to monitor a number of occurrences of performing an application-related activity for each employee in a predetermined peer grouping. The apparatus further includes an outlier determination module stored in the memory, executable by the processor and configured to determine one or more activity outliers from the from the predetermined peer grouping based at least in part on the number of occurrences of performing the application-related activity over the designated time period.

In specific embodiments of the apparatus, the predetermined peer grouping is based, at least in part, on a job title, a job title and a hierarchy within the entity or a job title and two or more hierarchies within the entity.

In further specific embodiments of the apparatus, the activity monitoring module is further configured to monitor the number of occurrences of accessing non-public information over the designated time period for each employee in the predetermined peer grouping. In other related embodiments of the apparatus, the activity monitoring module is further configured to monitor the number of occurrences of performing a high risk application-related activity, such as an activity related to customer accounts/transactions, for each employee in the predetermined peer grouping.

In additional specific embodiments of the apparatus, the outlier determination module is further configured to determine a z-score for each of the employees based on the number of occurrences of performing the application-related activity over the designated time period. In such embodiments of the apparatus, the outlier determination module is further configured to determine the activity outlier based on the z-score meeting or exceeding a predetermined z-score threshold. In further such embodiments of the apparatus, the outlier determination module is further configured to determine, for each of the employees, the z score by determining a variance from a peer group average number of occurrences of performing the application-related activity over the designated time period and determining a standard deviation, for each of the employees, based on a cumulative total number of occurrences of performing the application-related activity over the designated time period.

Moreover, in additional specific embodiments the apparatus includes an investigation module stored in the memory, executable by the processor and configured to provide a user the ability to investigate the one or more activity outliers to determine whether actions of the one or more activity outliers are adverse to best interests of the entity.

A computer program product including a non-transitory computer-readable medium defines third embodiments of the invention. The computer-readable medium includes a first set of codes for causing a computer to monitor, for each employee in a predetermined peer group, a number of occurrences of performing an application-related activity over a designated time period. Additionally, the computer-readable medium includes a second set of codes for causing a computer to determine one or more activity outliers from amongst the employees based at least in part on the monitoring of the number of occurrences of performing the application-related activity over the designated time period.

Thus, embodiments of the invention are described in greater detail below that provide for determining activity outliers from amongst employees/associates within a predetermined peer group of a business entity. By identifying activity outliers the present invention identifies outliers based on the number of activities conducted by an employee/associate in comparison to the number of like-activities conducted by other members of the peer group. Such outlier detection provides for employees/associates to be identified that may have otherwise gone unidentified based on the activity not otherwise rising to a level of concern within the entity. Employees/associates identified as activity outliers may be further investigated to determine if the volume of activities is indicative of actions that are adverse to the best interests of the entity (i.e., unauthorized or illegal activities).

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
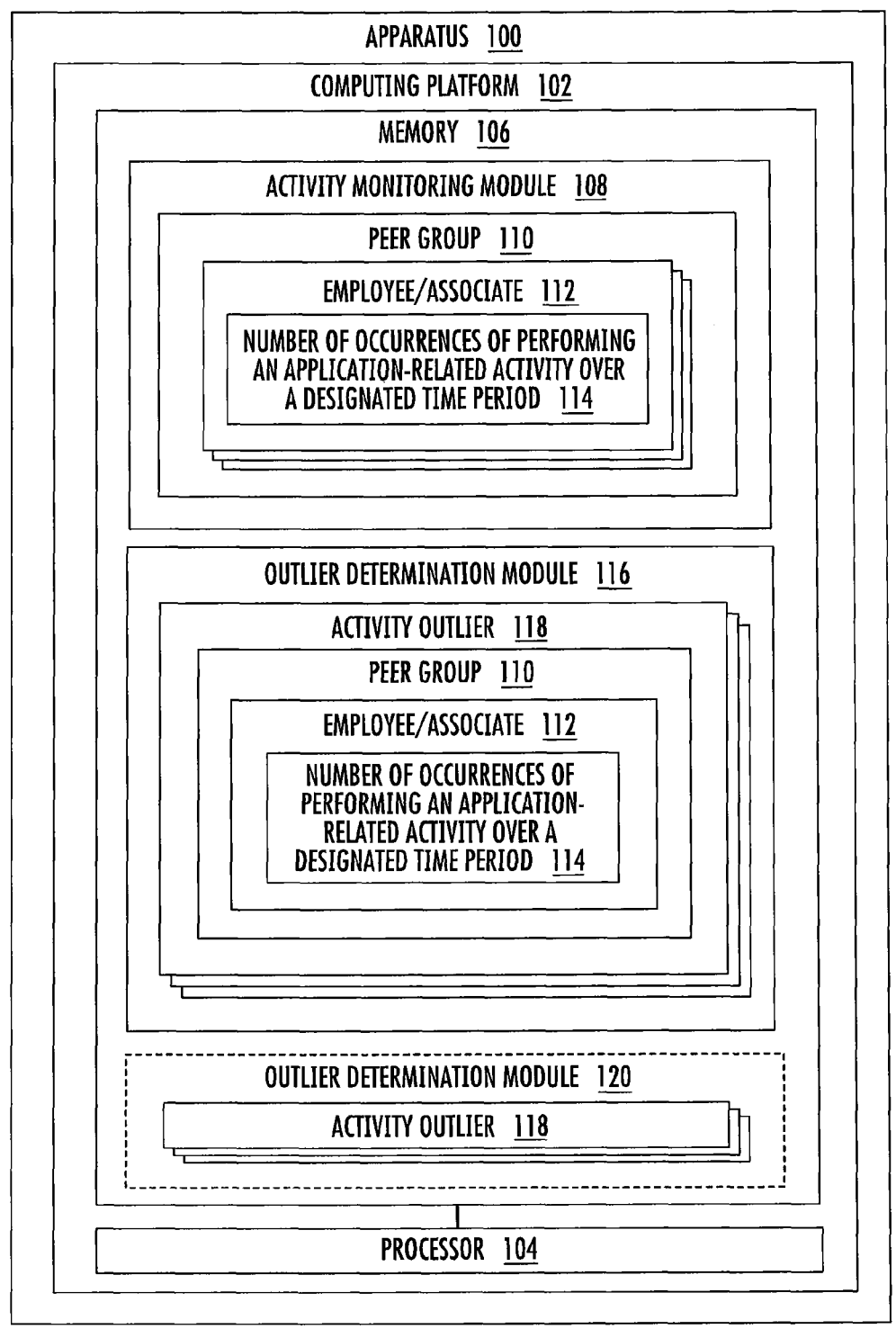
Figure 2:
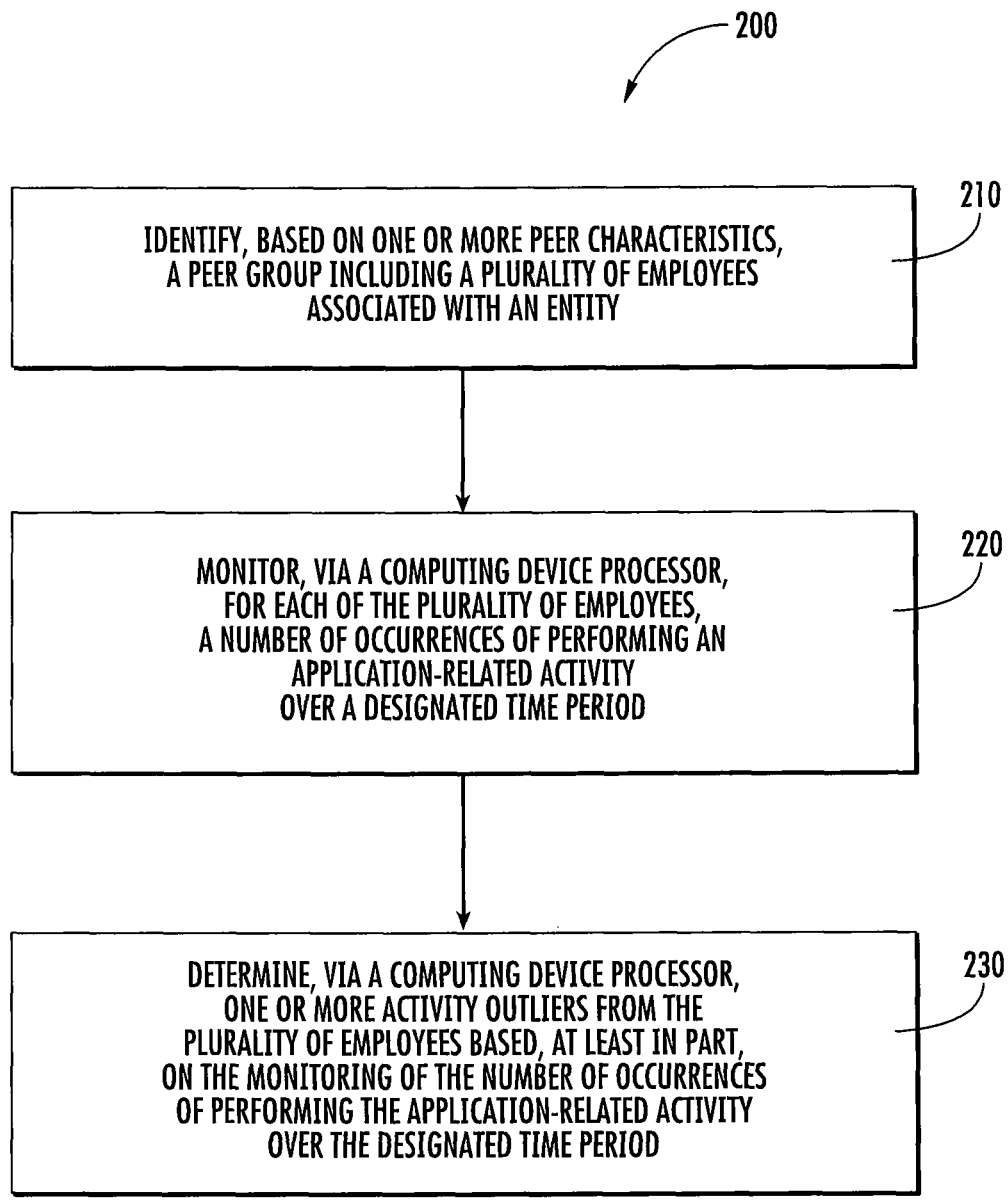
Figure 3:
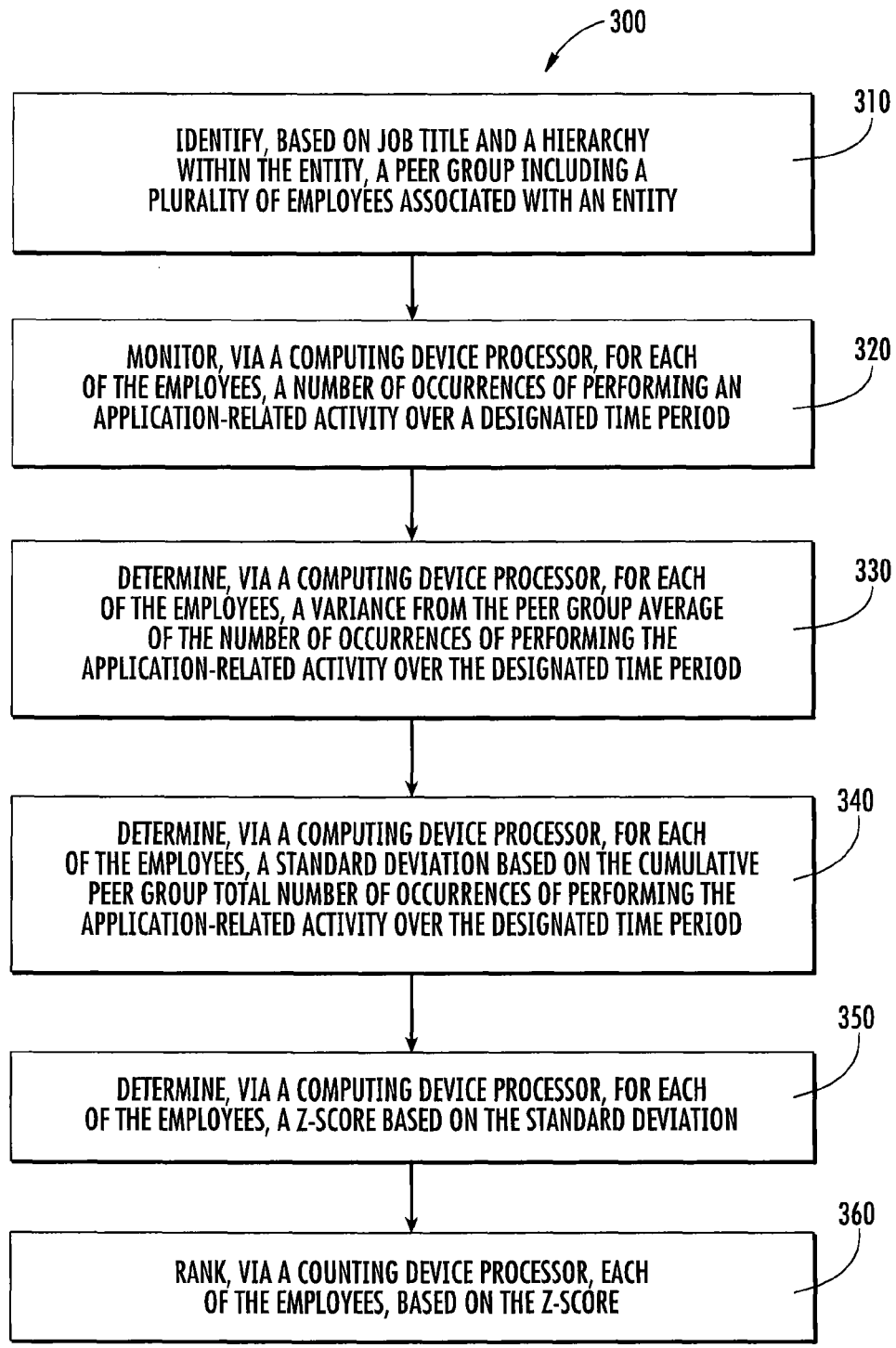
Figure 4:
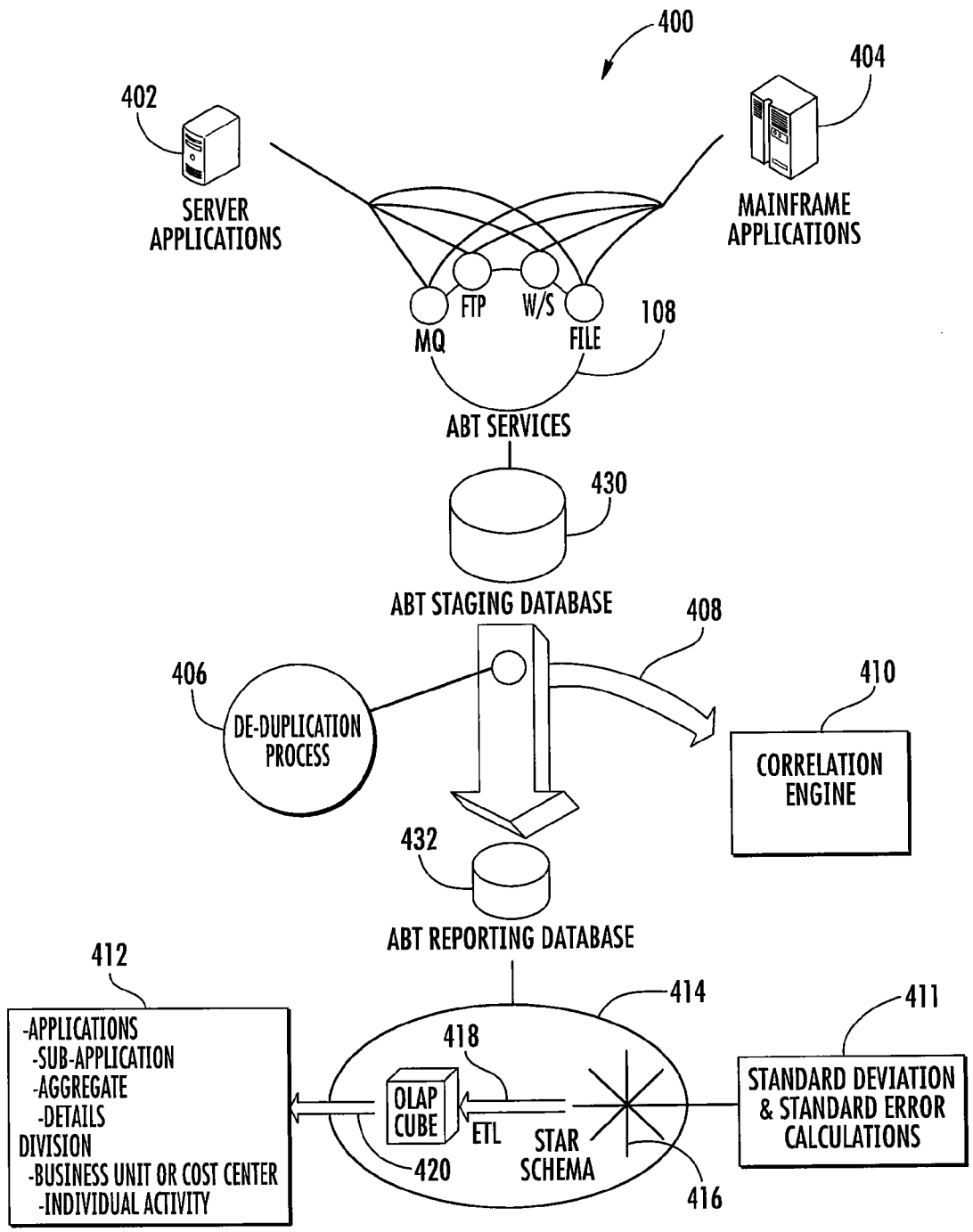
Figure 5:
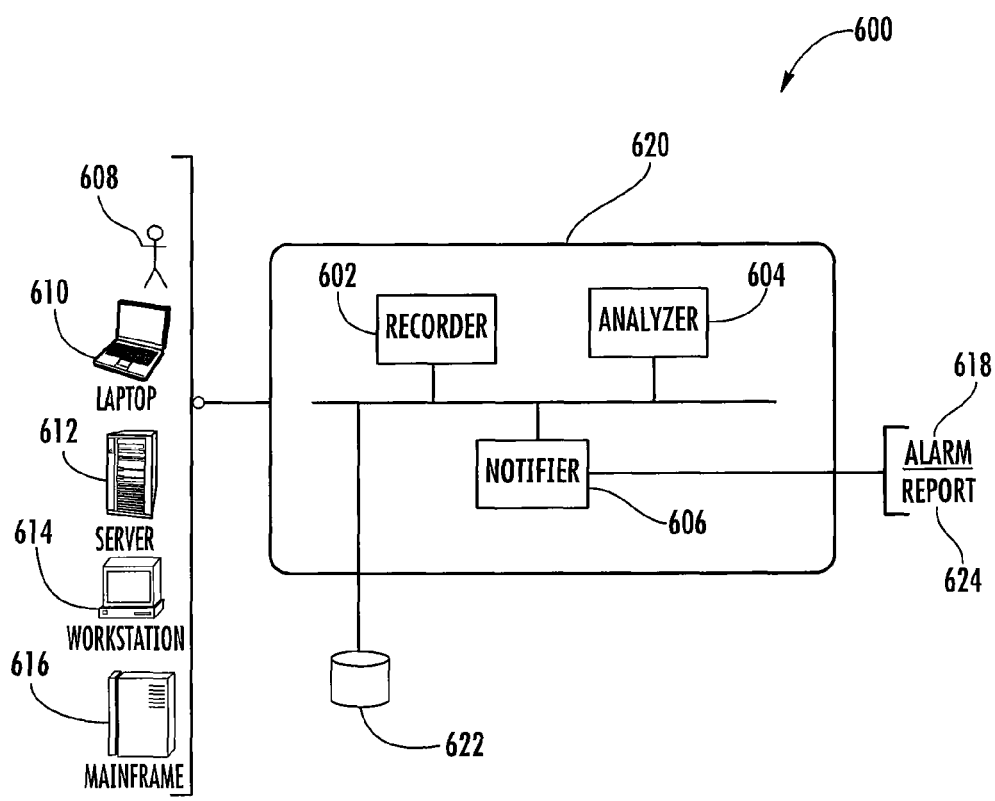

Having thus described embodiments of the invention in general terms, reference will now be made to the accompanying drawings, which are not necessarily drawn to scale, and wherein:

FIG. 1 is a block diagram of an apparatus configured to determine activity outliers from amongst a peer group of employees, in accordance with embodiments of the present invention;

FIG. 2 is a flow diagram of a method for determining activity outliers from amongst a peer group of employees, in accordance with embodiments of the present invention;

FIG. 3 is a more detailed flow diagram of an alternate method for determining activity outliers from amongst a peer group of employees, in accordance with embodiments of the present invention;

FIG. 4 is a schematic diagram of the architecture of a system for monitoring application-related activities, in accordance with one embodiment of the present invention; and FIG. 5 is a schematic diagram showing general operation of a system for monitoring application-related activity in a distributed computing network, in accordance with embodiments of the present invention; and

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods apparatus systems and computer program products are described herein that provide for identifying activity outliers from amongst employees/associates within a predetermined peer group of employees. The inventive concepts herein disclosed require establishing consistent peer groupings of employees/associates. In specific embodiments, the peer groupings may be defined by combining one or more and, typically two, line of business hierarchies and job title. Once the peer grouping is established, monitoring of predetermined activities within designated applications is performed to determine the number of occurrence of the predetermined activities over a designated period of time. Activity outliers are subsequently determined based on the number of occurrence of the predetermined activities over the designated period of time. In specific embodiments, such determination of activity outliers includes determining the peer group average, determining an employee/associate's variance from the average, determining the employee/associate's standard deviation and determining the employee/associate's z-score. The z-scores are then ranked in descending order to identify the activity outliers. In specific embodiments, a positive z score indicates an activity outlier and further investigation is conducted on the activity outlier to determine if the activities conducted by the employee/associate are adverse to the best interests of the business entity.

Referring to FIG. 1, a block diagram is presented of an apparatus 100 configured to provide for determination of activity outliers from amongst a peer group within an entity, in accordance with embodiments of the present invention. The apparatus includes a computing platform 102 having a processor 104 and a memory 106 in communication with the processor 104. The memory 104 of apparatus 100 stores activity monitoring module 108 which is executable by processor 104 and configured to monitor, for each employee/associate 112 in a designated peer group 110, the number of occurrences of performing an application-related activity over a designated period of time 114.

The peer group 110 is defined by one or more peer characteristics, such as, but not limited to, job title, hierarchy or the like. In specific embodiments, the peer group 110 is defined by job title and hierarchy within the entity. In further specific embodiments, the peer group 110 is defined by job title and more than one hierarchy within the entity.

The application-related activity may be any activity, function or the like carried out in conjunction with a computer-implemented application that is capable of being monitored. Examples of monitored activities include, but are not limited to, accessing non-public information, such as customer data, customer profiles and the like; performing an activity associated with a customer account or customer transactions. In one specific embodiment, in which the entity is a financial institution and the employees are financial institution associates, the application-related activities may include any activity that is deemed to be high risk. A high risk activity may be any activity conducted by the associate which may be associated with unauthorized or illegal actions. While the high risk activity itself may very well be within the scope of the employment of the associate, when the number of occurrences of such an activity is in excess of the peer group average number of occurrences of the activity and outlier may be identified, which may signify the need for further investigation.

The designated period of time over which the monitoring of activities occurs may vary depending on the needs of the entity. Exemplary periods of time include, but are not limited to, a day, a week, a month, a quarter, a year or the like.

The memory 106 of apparatus 100 additionally includes outlier determination module 116, which is executable by the processor 104 and configured to determine activity outliers 118 from amongst the employees 112 in the peer group 110 based on the number of occurrences of performing an application-related activity over the designated period of time 114. In specific embodiment of the invention, the outlier determination module 116 may determine activity outliers 118 by determining a z-score for each of the employees 112 in the peer group 110 and ranking the employees based on their respective z-scores. In such embodiments, a z-score threshold may be predetermined, such that any z-score exceeding (and in some embodiments meeting) the predetermined z-score threshold is determined to be an activity outlier. In one such embodiment, the z-score threshold may be defined as two, such that any z-score greater than or equal to two determined to be an activity outlier. In such embodiments of the invention, the z-score may be determined by determining, for each of the employees, a variance from the peer group average of the number of occurrences of performing the application-related activity over the designated time period and determining a standard deviation, for each of the employees, based on the variances and the total peer group number of occurrences of performing the application-related activity over the designated time period.

In optional embodiments of the invention, the memory 106 of apparatus 100 may include outlier investigation module 120, which is executable by processor 104 and configured to provide a user the ability to investigate the one or more activity outliers 118 to determine whether the application-related activities performed by the activity outlier 118 are adverse to the best interests on the entity (i.e., unauthorized or illegal activities performed by the employee). In some instances, investigation of the application-related activities performed by the activity outlier 118 may determine that the activities were with the normal course of the employee's job functions (e.g., the employee is a high-level employee or the like). While in other instances, investigation of the activity outliers may include accessing ancillary data related to the activities to determine if the activities are adverse to the best interests of the entity.

FIG. 2 provides a flow diagram of a method 200 for determining activity outliers from amongst a peer grouping of employees within an entity, in accordance with embodiments of the present invention. At Event 210, a peer group, which includes a plurality of employees/associates within an entity, is identified based on one or more peer characteristics. In accordance with specific embodiments the peer characteristics may include, but are not limited to, job title, hierarchy within the organization and the like. In one specific embodiment, the peer characteristics that define a peer group are job title and a hierarchy (or more than one hierarchy) within the entity. The chosen level of the hierarchy within the entity should be such that the resulting peer group is properly distinguishable in terms of job functions and activities.

For example, in one specific embodiment of the invention, in which two peer group characteristics are selected, the first peer group characteristic is job code/job title and the second peer group characteristic is organizational hierarchy. In large corporations/enterprises or the like, job code/job title tends to be a broad peer group characteristic, i.e., one job title peer group may have a large number of employees/associates. If a peer group is large, the likelihood of employees having similar attributes, such as number of occurrences of performing an activity or the like, is small, as such only those attributes that are common to the peer group would appear as normal, whereas all other attributes would tend to appear as outliers. Conversely, in large corporations/enterprises or the like, organizational hierarchy tends to be a narrow peer group characteristic, i.e., one peer group/hierarchy may be limited to as few as one employee/associate. If a peer group is small, everything occurring within the peer group tends to be viewed as "normal". In the instance in which an organizational hierarchy community is defined by a single employee/associate, the employee's number of occurrences of performing an activity is equal to the average, and therefore there is no deviation from the norm.

At Event 220, a predetermined application-related activity is monitored, for each of the employees in the peer group, to assess the number of occurrences of performing the activity within a predetermined time period. The predetermined application-related activity may be any activity associated with a monitored computer-implemented application. Typically, the monitored activity is a high-risk activity, such as those that involve the access of non-public private information, such as customer data or the like; wire transfers or other customer account transactions, access to document images and the like. However, by monitoring any and/or all activities the present invention can determine activity outliers for those activities that are not currently deemed to be high risk or identify an outlier for activities which when considered in combination with other events and/or activities may rise to the level of suspicious activity and/or unauthorized activity. As previously noted, the designated time period may be any time period warranted by the entity, such as, but not limited to, a day, a week, a month, a quarter within a year, a year or the like.

At Event 230, one or more activity outliers are determined from amongst the employees in the peer group based on the number of occurrences of performing an application-related activity over the designated time period. In specific embodiments, activity outliers are determined by normalizing the number of occurrences of performing an application-related activity in comparison to the peer group averages. According to specific embodiments of the invention, normalization may include determining a z-score for each of the employees in the group and determining activity outliers based on a predetermined z-score threshold. In optional embodiments of the invention, once the activity outliers are determined, further investigation (not shown in FIG. 2) may be necessary to determine if the activities associated with the activity outlier are adverse to the best interests of the entity (i.e., unauthorized, illegal or the like).

Referring to FIG. 3 a more detailed flow diagram is depicted of an alternate method 300 for determining activity outliers from amongst a peer group of employees, in accordance with embodiments of the present invention. At Event 310, a peer group, which includes a plurality of employees/associates within an entity, is identified based on job title and hierarchy within the entity. The hierarchy within the entity may be a business unit or line of business hierarchy or the like.

At Event 320, a predetermined application-related activity is monitored, for each of the employees in the peer group, to assess the number of occurrences of performing the activity within a predetermined time period. As previously noted, the predetermined application-related activity may be any activity associated with a monitored computer-implemented application, typically, a high-risk activities, such as those that involve the access of non-public information, such as customer data or the like; wire transfers or other customer account transactions, access to document images or the like.

At Event 330, a variance from the peer group average number of occurrences of performing the activity is determined for each of the employees in the peer group and, at Event 340, a standard deviation is determined for each of the employees in the peer group based on the peer group total number of occurrences of performing the application-related activity.

At Event 350, a z-score is determined for each of the employees in the peer group. The z-score is a normalized score that indicate how many standard deviations an employee's number of occurrences of the activity is away from the baseline peer group average. In specific embodiments, the z-score score equals the difference between the employee's number of occurrences of the activity and the peer group average divided by the employee's standard deviation.

At Event 360, a ranking of the employees in the peer group by z-scores is generated, such that the most prominent activity outlier appears at the top of the ranking. In specific embodiments, a z-score threshold is defined such that only those z-scores above the threshold are ranked, for example positive-valued (i.e., above zero) z-scores are ranked. In other specific embodiments, a z-score threshold is defined to identify activity outliers, for example, a z-score threshold above two indicates an activity outlier.

FIG. 4 is a schematic block diagram that illustrates architecture of a system 400 according to an exemplary embodiment of the present invention for monitoring application-related activity in a distributed computing network. For example, employees/associates can perform application-related activities, such as accessing secure data using a Web interface via server 402. Other employees/associates can perform application-related activities, such as accessing secure data via a mainframe 404. For example, in the financial institution example, an associate/employee or the like can access an application to request loan history information via a mainframe 404. On the other hand, an associate/employee or the like can perform an application-related activity using a server 402, for example, using a Web site or any software application interacting with the server 402 accessing secure data. Thus application being executed at server 402 and/or mainframe 404 applications are monitored by activity monitoring module 108 through services such as Message Queuing (MQ), File Transfer Protocol (FTP), Web Services (W/S), file or the like, interacting with the activity monitoring staging database 430. The activity monitoring module is configured to, among other functions, receive monitored activity data, parse the content of the data, apply business rules to the data, calculate hash values, insert data into activity monitoring staging database 430, where the data may be persisted to disk at any step in case of system failure.

Thereafter, data from the activity monitoring staging database 430 is processed and transferred to the activity monitoring reporting databases 432. The processing and transfer may include detecting for duplication processing 406 where duplicative information is flagged or deleted, and correlation 408 of rules for activities based upon events (using, for example, a correlation engine 410). According to exemplary implementations, additional processing can be performed upon storing in the activity monitoring reporting databases 432, including, but not limited to, determining activity outliers, statistical calculations for standard deviation and standard error 411 and providing reports 412 for application and business units 414, wherein detail access information is stored 416, information is aggregated into an OLAP (OnLine Analytical Process) cube 418, and finally the aggregated data and statistically calculated information is provided for reporting, cross-tabulation, and automated alerting 420.

FIG. 5 is a diagram showing general operation of a system for monitoring application-related activity in a distributed computing network 600, according to an exemplary embodiment of the present invention.

As shown in FIG. 5 an exemplary system 620 monitors application-related activity, such as access to specified secure data and performance of specified activities in a distributed computing network 600, the system 620 includes a recorder 602 for recording information indicative of the occurrence of an application-related activity, such as access to specified application-related data or performance of specified activities for a plurality employees/associates 608 performing the activities via one of the exemplary systems 610-616, such as laptop 610, server 612, workstation 614 and/or mainframe 616. The system provides a storage unit 622 for retaining monitored occurrences of application-related activities and an analyzer 604 for analyzing the number of occurrences of application-related activity to determine if the number occurrences rise to the level of an activity outlier. Further, the system may include a notifier 610 for generating a real-time notification/alarm 618 and/or historical report(s) 612, including information indicative of an activity outlier.

Thus, methods apparatus systems and computer program products are described above provide for determining activity outliers from amongst employees/associates within a predetermined peer group of a business entity. By identifying activity outliers the present invention identifies outliers based on the number of activities conducted by an employee/associate in comparison to the number of like-activities conducted by other members of the peer group. Such outlier detection provides for employees/associates to be identified that may have otherwise gone unidentified based on the activity not otherwise rising to a level of concern within the entity. Employees/associates identified as activity outliers may be further investigated to determine if the volume of activities is indicative of actions that are adverse to the best interests of the entity (i.e., unauthorized or illegal activities).

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for identifying activity outliers from amongst a peer group within a financial institution, the method comprising:

identifying the peer group including a plurality of employees associated with the financial institution, wherein the peer group is defined by employees having a same job title and included within more than one line-of business hierarchies within the financial institution;

monitoring, via a computing device processor, for each of the plurality of employees in the peer group, a number of occurrences of high-risk employee activities including (1) accessing Non-Public Personal Information (NPPI), (2) conducting wire transfers, and (3) accessing document images, over a predetermined time period; and determining, via a computing device processor, one or more activity outliers from the plurality of employees based at least in part on the monitoring of the number of occurrences of the employee activities, wherein the determined activity outliers result in further investigation by the financial institution to determine if the monitored employee activities are unauthorized activities performed by the activity outlier.

2. The method of claim 1, wherein monitoring the number of occurrences of performing the high risk employee activities further comprises monitoring, via the computing device processor, for each of the plurality of employees in the peer group, the number of occurrences of performing the high risk employee activities, wherein the high-risk employee activities include performing a transaction within a customer account.

3. The method of claim 1, wherein determining further comprises determining, via a computing device, a z-score for each of the plurality of employees in the peer group based on the monitoring, for each of the plurality of employees in the peer group, the number of occurrences of the high risk employee activities over the predetermined time period.

4. The method of claim 3, wherein determining the z-score further comprises:
   determining, via a computing device processor, for each of the plurality of employees in the peer group, a variance from a peer group average number of occurrences of the high risk employee activities over the predetermined time period; and
   determining, via a computing device processor, a standard deviation, for the plurality of employees in the peer group, based on a total peer group number of occurrences of the high risk employee activities over the predetermined time period.

5. The method of claim 3, wherein determining further comprises determining, via the computing device processor, the one or more activity outliers based on the z-score meeting or exceeding a predetermined z-score threshold.

6. An apparatus for identifying activity outliers from amongst a peer group within a financial institution, the apparatus comprising:
   a computing platform including a processor and a memory in communication with the processor;
   an activity monitoring module stored in the memory, executable by the processor and configured to monitor a number of occurrences of high-risk employee activities including (1) accessing Non-Public Personal Information (NPPI)), (2) conducting wire transfers, and (3) accessing document images, over a predetermined time period for each employee in a predetermined peer group, wherein the peer group includes employees having a same job title and included within more than one line-of-business hierarchies within the financial institution; and
   an outlier determination module stored in the memory, executable by the processor and configured to determine one or more activity outliers from the predetermined peer group based at least in part on the number of occurrences of the high risk employee activities over the predetermined time period,
   wherein the determined activity outliers result in further investigation by the financial institution to determine if the monitored employee activities are unauthorized activities performed by the activity outlier.

7. The apparatus of claim 6, wherein the activity monitoring module is further configured to monitor the number of occurrences of performing the high risk employee activities, wherein the high-risk employee activities include performing a transaction within a customer account.

8. The apparatus of claim 6, wherein the outlier determination module is further configured to determine a z-score for each of the employees in the peer group based on the number of occurrences of the high risk employee activities over the predetermined time period.

9. The apparatus of claim 8, wherein the outlier determination module is further configured to determine, for each of the employees in the peer group, a variance from a peer group average number of occurrences of the high risk employee activities over the predetermined time period and determine a standard deviation, for each of the employees in the peer group, based on a total peer group number of occurrences of the high risk employee activities over the predetermined time period.

10. The apparatus of claim 8, wherein the outlier determination module is further configured to determine the one or more activity outliers based on the z-score meeting or exceeding a predetermined z-score threshold.

11. A computer program product including a non-transitory computer-readable medium, the medium comprising:
    a first set of codes for causing a computer to monitor, for each employee in a predetermined peer group within a financial institution, a number of occurrences of high-risk employee activities including (1) accessing Non-Public Personal Information (NPPI), (2) conducting wire transfers, and (3) accessing document images, over a predetermined time period, wherein the peer group includes employees having a same job title and included within more than one line-of-business hierarchies within the financial institution; and
    a second set of codes for causing a computer to determine one or more activity outliers from amongst the employees in the peer group based at least in part on the monitoring of the number of occurrences of the high risk employee activities over the predetermined time period.

12. The computer program product of claim 11, wherein the first set of codes is further configured to cause the computer to monitor, for each employee in the predetermined peer group, the number of occurrences of performing a high risk employee activities, wherein the high-risk employee activities include performing a transaction within a customer account.

13. The computer program product of claim 11, wherein the second set of codes is further configured to cause the computer to determine a z-score for each of the employees in the peer group based on the number of occurrences of the high risk employee activities over the predetermined time period.

14. The computer program product of claim 13, wherein the second set of codes is further configured to cause the computer to determine, for each of the employees in the peer group, a variance from a peer group average number of occurrences of the high risk employee activities over the predetermined time period and determine a standard deviation, for each of the employees in the peer group, based on a total peer group number of occurrences of the high risk employee activities over the predetermined time period.

15. The computer program product of claim 13, wherein the second set of codes is further configured to cause the computer to determine the one or more activity outliers based on the z-score meeting or exceeding a predetermined z-score threshold.

16. The computer program product of claim 11, further comprising a third set of codes for causing a computer to provide a user the ability to investigate the one or more activity outliers to determine whether actions of the one or more activity outliers are unauthorized activities performed by the activity outlier.

* * * * *